(12) United States Patent
Hansz

(10) Patent No.: US 6,179,366 B1
(45) Date of Patent: Jan. 30, 2001

(54) SUNSHADE MOUNTING CLIP ASSEMBLY

(75) Inventor: Thomas J. Hansz, Rochester Hills, MI (US)

(73) Assignee: General Motors Corporation, Detroit, MI (US)

(*) Notice: Under 35 U.S.C. 154(b), the term of this patent shall be extended for 0 days.

(21) Appl. No.: 09/460,505

(22) Filed: Dec. 14, 1999

(51) Int. Cl.[7] .................................. B60J 3/00; G12B 9/00
(52) U.S. Cl. ........................ 296/97.9; 296/214; 248/27.3
(58) Field of Search ................... 296/214, 97.9; 248/27.3

(56) References Cited

U.S. PATENT DOCUMENTS

| | | | |
|---|---|---|---|
| 4,981,323 | * 1/1991 | Dowd et al. | 296/214 |
| 4,989,911 | * 2/1991 | Van Order | 296/97.9 |
| 5,031,953 | * 7/1991 | Miller | 296/97.9 |
| 5,186,517 | * 2/1993 | Gilmore et al. | 296/214 |
| 5,358,299 | * 10/1994 | Seto | 296/97.9 |
| 5,511,844 | * 4/1996 | Boardman | 296/214 |
| 5,560,575 | * 10/1996 | Krysiak | 296/214 |
| 5,636,891 | * 6/1997 | Van Order et al. | 296/214 |
| 5,765,896 | * 6/1998 | Grisval | 296/97.9 |
| 5,765,897 | * 6/1998 | Snyder et al. | 296/97.9 |
| 5,868,370 | * 2/1999 | Nivet | 296/97.9 |
| 5,876,084 | * 3/1999 | Smith et al. | 296/214 |
| 6,003,928 | * 12/1999 | Courtindale | 296/214 |
| 6,007,136 | * 12/1999 | Zittwitz et al. | 296/97.9 |
| 6,015,126 | * 1/2000 | Murdock | 296/97.9 |
| 6,021,986 | * 2/2000 | Murdock | 296/214 |
| 6,068,323 | * 5/2000 | Brown et al. | 296/97.9 |

* cited by examiner

Primary Examiner—D. Glenn Dayoan
Assistant Examiner—Hilary Gutman
(74) Attorney, Agent, or Firm—Jeffrey A Sedlar

(57) ABSTRACT

A sunshade mounting clip assembly for a vehicle includes a mounting clip adapted to be disposed adjacent a headliner covering a roof of a vehicle for cooperating with a sunshade. The mounting clip has a shaft extending outwardly therefrom. The sunshade mounting clip assembly also includes a mounting support adapted to be disposed adjacent the headliner on a side opposite the mounting clip and having an aperture extending therethrough to receive the shaft. The sunshade mounting clip assembly further includes a retainer disposed adjacent the mounting support having an aperture to receive the shaft and preventing the shaft from exiting the mounting support. The mounting support extends laterally and longitudinally to form a footprint greater than a footprint of the retainer.

20 Claims, 2 Drawing Sheets

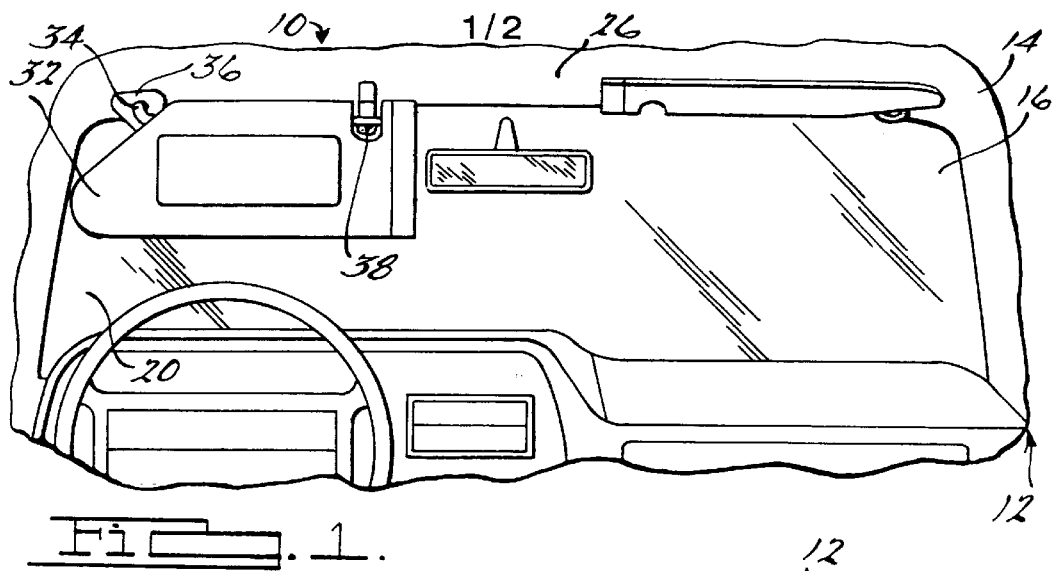
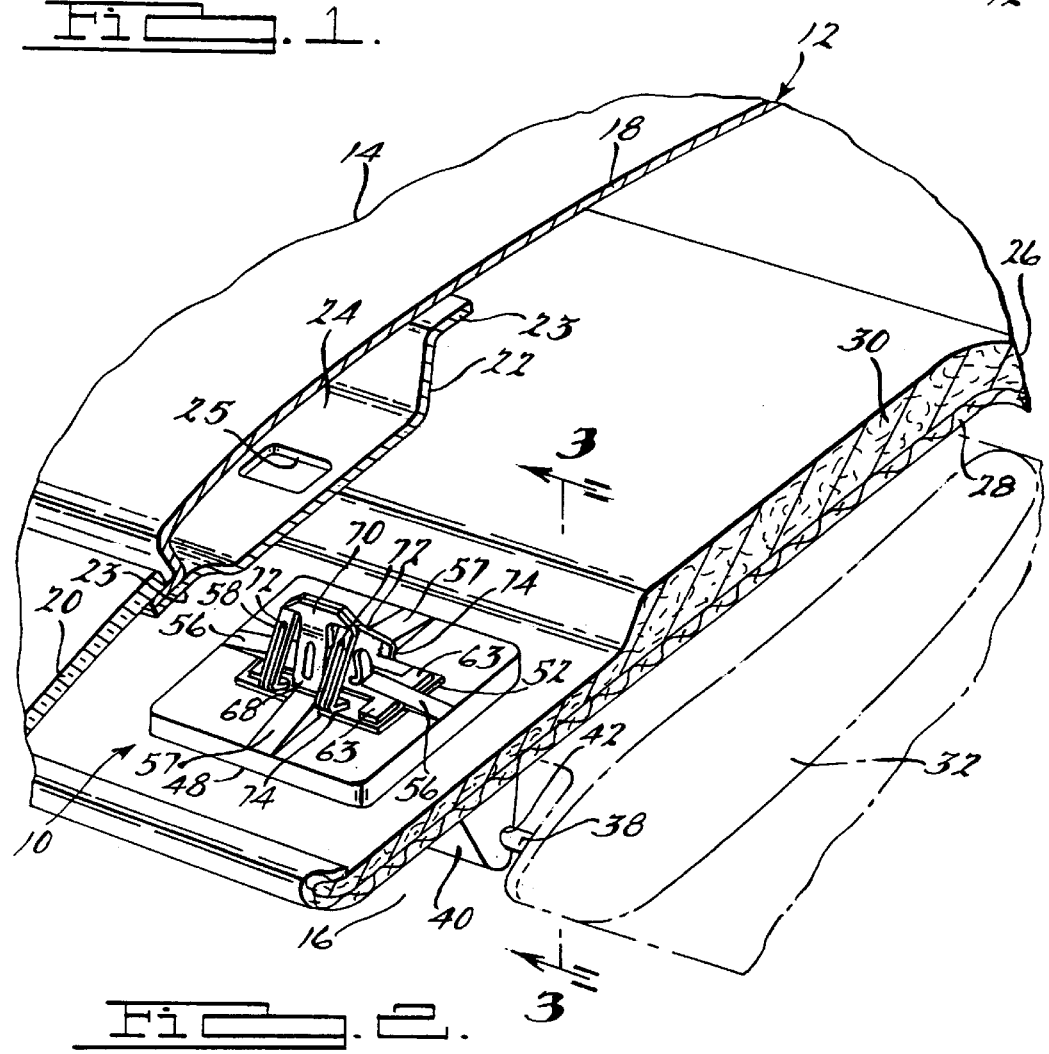

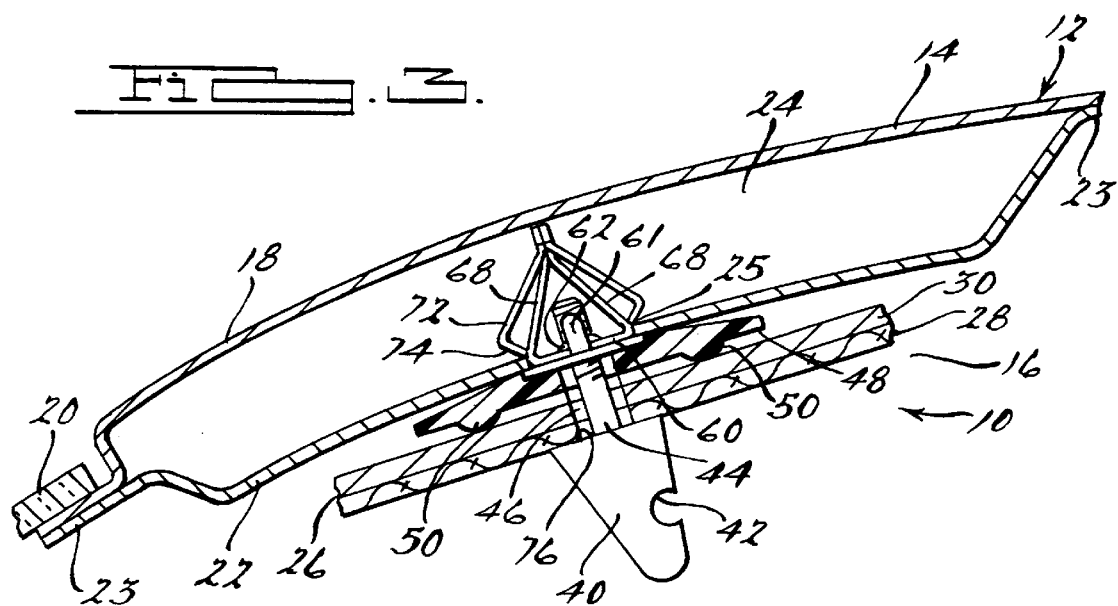

SUNSHADE MOUNTING CLIP ASSEMBLY

TECHNICAL FIELD

The present invention relates generally to sunshades for vehicles and, more particularly, to a sunshade mounting clip assembly for a vehicle.

BACKGROUND OF THE INVENTION

It is known to provide a sunshade or visor for a vehicle such as a sport utility vehicle or a pick-up truck. Typically, the sunshade is rectangular in shape and pivotally attached at one end to a headliner of the vehicle. The sunshade also includes a mounting clip having a C-shaped recess mounted to the headliner to removably receive the other end of the sunshade. The mounting clip is typically attached to the headliner by screws extending through the mounting clip in combination with metal spacers, seals and clips to accomplish the attachment.

Although the above has worked, it is desirable to provide a new mounting clip for a sunshade. It is also desirable to provide a sunshade mounting clip that can be used with different types of substrates. It is further desirable to provide a sunshade mounting clip that does not rotate and is self-aligned for assembly. Therefore, there is a need in the art to provide a sunshade mounting clip assembly for a vehicle.

SUMMARY OF THE INVENTION

It is, therefore, one object of the present invention to provide a sunshade mounting clip assembly for a vehicle.

It is another object to provide a sunshade mounting clip assembly for a vehicle that requires a low insertion force.

It is yet another object of the present invention to provide a sunshade mounting clip assembly that does not rotate and is self-aligned for assembly.

To achieve the foregoing objects, the present invention is a sunshade mounting clip assembly for a vehicle. The sunshade mounting clip assembly includes a mounting clip adapted to be disposed adjacent a headliner covering a roof of a vehicle for cooperating with a sunshade. The mounting clip has a shaft extending outwardly therefrom. The sunshade mounting clip assembly also includes a mounting support adapted to be disposed adjacent the headliner on a side opposite the mounting clip and having an aperture extending therethrough to receive the shaft. The sunshade mounting clip assembly further includes a retainer disposed adjacent the mounting support having an aperture to receive the shaft and preventing the shaft from exiting the mounting support. The mounting support extends laterally and longitudinally to form a footprint greater than a footprint of the retainer.

One advantage of the present invention is that a sunshade mounting clip assembly is provided for a vehicle. Another advantage of the present invention is that the sunshade mounting clip assembly has a mounting support formed as a single piece keyed for correct orientation for a vehicle. Yet another advantage of the present invention is that the sunshade mounting clip assembly has the mounting support made from a non-corrosive material. Still another advantage of the present invention is that the sunshade mounting clip assembly has anti-rotation tabs and self-aligning tabs which reduce assembly time and mis-builds. A further advantage of the present invention is that the sunshade mounting clip assembly can be used with different types of substrates and requires a low insertion force to install final assembly, eliminating insertion problems due to over-tightening. Yet a further advantage of the present invention is that the sunshade mounting clip assembly improves quality due to easier installation and reduces and/or eliminates mis-installs (loose assemblies) due to clips not being seated. Still a further advantage of the present invention is that the sunshade mounting clip assembly reduces cost, resulting from fewer warranty issues and less repairs from mis-installs.

Other objects, features and advantages of the present invention will be readily appreciated, as the same becomes better understood after reading the subsequent description taken in conjunction with the accompanying drawings.

BRIEF DESCRIPTION OF THE DRAWINGS

FIG. 1 is an elevational view of a sunshade mounting clip assembly, according to the present invention, illustrated in operational relationship with a vehicle.

FIG. 2 is a fragmentary perspective view of the sunshade mounting clip assembly of FIG. 1 illustrating a sunshade in a stowed position.

FIG. 3 is a sectional view taken along line 3—3 of FIG. 2.

FIG. 4 is an exploded perspective view of the sunshade mounting clip assembly of FIG. 1.

DESCRIPTION OF THE PREFERRED EMBODIMENT

Referring to the drawings and in particular FIGS. 1 through 3, one embodiment of a sunshade mounting clip assembly 10, according to the present invention, is shown for a vehicle such as a pick-up truck, generally indicated at 12. The vehicle 12 includes a vehicle body 14 forming an occupant compartment 16. The vehicle body 14 includes a roof 18 and a windshield 20 extending forwardly and downwardly at a front longitudinal end thereof. The vehicle body 14 also includes a windshield frame reinforcement or roof rail 22 extending laterally beneath the roof 18 adjacent the windshield 20. The roof rail 22 has a pair of opposed flanges 23 extending outwardly toward the roof 18 to form a space therebetween. The roof rail 22 includes at least one opening 25 therein for a function to be described. It should be appreciated that the flanges 23 of the roof rail 22 are secured to the roof 18 by suitable means such as welding.

The vehicle 12 also includes a headliner 26 disposed adjacent the roof 18 to cover an interior side of the roof 18 and roof rail 22 of the vehicle body 14. The headliner 26 extends laterally and longitudinally and is generally rectangular in shape. The headliner 26 is made of a relatively stiff molded backing sheet 28 and a relatively deformable foam panel 30 adhesively secured to the undersurface of the backing sheet 28. Preferably, the headliner 26 is formed as a single piece.

The vehicle 12 further includes a sunshade or visor 32 mounted the headliner 26 and vehicle body 14 by the sunshade mounting clip assembly 10 to be described. The sunshade 32 is generally rectangular in shape. The sunshade 32 has a pivot arm 34 on one lateral side mounted to the headliner 26 by suitable means such as a bracket 36 and fasteners (not shown) such as screws. The sunshade 32 also has a rod 38 on the other lateral side for removably attaching the sunshade 32 to the sunshade mounting clip assembly 10 to be described. It should be appreciated that the pivot arm 34 and rod 38 allow the sunshade 32 to be stowed in a stowed position as illustrated in FIG. 2 and folded down to an operative position as illustrated in FIG. 1. It should also be appreciated that the rod 38 may be removed from the sunshade mounting clip assembly 10 and the sunshade 32 rotated via the pivot arm 34 to a second operative position. It should further be appreciated that, except for the sunshade mounting clip assembly 10, the vehicle 12 is conventional and known in the art.

Referring to FIGS. 2 through 4, the sunshade mounting clip assembly 10 includes a sunshade mounting clip 40 for engaging and disengaging the rod 38 of the sunshade 32. The sunshade mounting clip 40 extends laterally and has a generally trapezoidal shape. The sunshade mounting clip 40 has a generally C-shaped recess 42 extending laterally to receive the rod of the sunshade 32. The sunshade mounting clip 40 also has a shaft 44 extending outwardly from a bottom thereof. The shaft 44 is generally cylindrical in shape with a generally circular cross-section. The shaft 44 may have a bushing 46 disposed about the shaft 44. It should be appreciated that the sunshade mounting clip 40 is conventional and known in the art.

The sunshade mounting clip assembly 10 also includes a mounting support 48 disposed adjacent the headliner 26 between the headliner 26 and roof rail 22. The mounting support 48 extends laterally and longitudinally and is generally rectangular in shape. The mounting support 48 is made of a rigid material, preferably a plastic material such as ABS. The mounting support 48 has at least one, preferably a plurality of anti-rotation tabs or projections 50 extending outwardly and spaced longitudinally and laterally to abut or engage the panel 30 of the headliner 26. The projections 50 have a semicircular cross-sectional shape. The mounting support 48 also has a base portion 52 extending outwardly from a side opposite the projections 50. The base portion 52 is generally planar and rectangular in shape. The mounting support 48 has an aperture 54 extending therethrough and through the base portion 52 to receive the shaft 44 of the sunshade mounting clip 40. The mounting support 48 further has at least one, preferably a plurality of opposed locating ramp portions 56 and support ramp portions 57 extending from the edges thereof and into the base portion 52 toward the aperture 54. The ramp portions 56 and 57 are inclined upwardly from the edges to the base portion 52. The locating ramp portions 56 have a width less than the support ramp portions 57 to locate a retainer 58 to be described. The mounting support 48 is a monolithic structure being integral, unitary and one-piece. It should be appreciated that the rectangular shape of the mounting support 48 assures proper alignment of the mounting support 48 to the headliner 26 for easier component installation and for easier fixturing and loading of the components for pre-assembly. It should further be apperciated that the mounting support 48 extends laterally and longitudinally to form a relative large footprint compared to the opening 25 and allows for higher torques during the sub-assembly process which will eliminate clips crushing into the headliner 26.

The mounting clip support assembly 10 further includes a retainer 58 disposed adjacent the mounting support 48 and engaging the shaft 44 of the mounting clip 40 to retain the mounting clip 40 to the mounting support 48. The retainer 58 has a base 60 which is generally planar and has an aperture 61 extending therethrough to receive the shaft 44 of the sunshade mounting clip 40. The base 60 also has a catch 62 extend inwardly into the aperture 61 to engage the shaft 44 of the sunshade mounting clip 40 and be retained thereto. The retainer 58 also has a plurality of locating tabs 63 extending outwardly from the base 60. The tabs 63 are generally "L" shaped and extend in pairs laterally from the lateral ends of the base 60. The tabs 63 at each end are spaced longitudinally to form a space 64 therebetween to receive the locating ramp portions 56 of the mounting support 48. The space 64 is formed by a flange 66 bent upwardly. The retainer 58 also has a plurality of opposed arms 68 extending upwardly from the base 60 toward each other. The arms 68 have a flange 70 extending laterally at an upper end thereof. The retainer 58 also has at least one, preferably a plurality of retaining legs 72 extending from the flange 70 outwardly and downwardly toward the base 60. The retainer legs 72 have a flange 74 extending inwardly and downwardly toward the base 60. The retainer 58 is made of a metal material such as steel and is formed as a monolithic structure being integral, unitary and one-piece. It should be appreciated that the retaining legs 72 are deflectable relative to the flange 70. It should also be appreciated that the mounting support 48 form a footprint greater than a footprint of the retainer In operation of the mounting clip support assembly 10, the mounting support 48 is disposed adjacent the panel 30 of the headliner 26 such that the projections 50 engage the panel 30. The mounting clip 40 is moved toward the backing sheet 28 of the headliner 26 and the shaft 44 is extended through an aperture 76 in the headliner 26 and the aperture 54 in the mounting support 48. The retainer 58 is placed over the shaft 44 and moved toward the mounting support 48 such that the shaft 44 extends through the aperture 61 in the base 60 and the locating ramp portions 56 are disposed in the space 64 between the locating tabs 63 as illustrated in FIG. 2. The locating tabs 63 locate the retainer 58 relative to the mounting support 48. The catch 62 adjacent the aperture 61 is engaged with the shaft 44 to prevent the shaft 44 from exiting the retainer 58. The projections 50 prevent rotation of the mounting support 48 once the mounting support 48 is attached to the headliner 26 by engagement with the panel 30 as illustrated in FIG. 3.

Once the mounting clip assembly 10 is pre-assembled to the headliner 26, the headliner 26 is moved toward the roof 18 and roof rail 22 to extend the retainer 58 through the opening 25 and into the space 24 of the roof rail 22. The retainer legs 72 deflect inwardly as the retainer 58 is extended through the opening 25 and return to their original position once the retainer legs 72 are disposed in the space 24 of the flange 74, having passed through the opening 25. The flanges 74 prevent the retainer 58 from exiting the roof rail 22. As illustrated in FIG. 3, the headliner 26 and sunshade mounting clip assembly 10 are installed in a secured position to the vehicle body 14. It should be appreciated that an operator (not shown) reaches through a side door window of the vehicle body 14 and pushes upward to snap in the sunshade mounting clip assembly 10 into the roof rail 22. It should also be appreciated that the sunshade mounting clip assembly 10 eliminates the need for a tool and reduces the efforts of the operator.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A sunshade mounting clip assembly for a vehicle comprising:
   a mounting clip adapted to be disposed adjacent a headliner covering a roof of a vehicle for cooperating with a sunshade, said mounting clip having a shaft extending outwardly therefrom;

a mounting support adapted to be disposed adjacent the headliner on a side opposite said mounting clip and having an aperture extending therethrough to receive said shaft; and a retainer disposed adjacent said mounting support having an aperture to receive said shaft and preventing said shaft from exiting said mounting support, said mounting support extending laterally and longitudinally to form a footprint greater than a footprint of said retainer.

2. A sunshade mounting clip assembly as set forth in claim 1 wherein said mounting support has at least one projection extending outwardly for engagement with the headliner to resist rotation of said mounting support relative to the headliner.

3. A sunshade mounting clip assembly as set forth in claim 1 wherein said mounting support includes a plurality of ramp portions.

4. A sunshade mounting clip assembly as set forth in claim 3 wherein said retainer has a plurality of spaces, one of said spaces receiving one of said ramp portions to locate said retainer relative to said mounting support.

5. A sunshade mounting clip assembly as set forth in claim 1 wherein said retainer includes a plurality of retainer legs extending outwardly and adapted to extend through an aperture in the roof.

6. A sunshade mounting clip assembly as set forth in claim 5 wherein each of said retainer legs has a flange extending inwardly to prevent said retainer legs from exiting the aperture in the roof.

7. A sunshade mounting clip assembly as set forth in claim 1 wherein said retainer has a catch extending inwardly into said aperture to engage said shaft and retain said retainer thereto.

8. A sunshade mounting clip assembly as set forth in claim 1 wherein said mounting support has a raised base portion, said aperture extending through said base portion.

9. A sunshade mounting clip assembly as set forth in claim 8 wherein said mounting support includes a plurality of ramp portions, one of said ramp portions extending from an edge of said mounting support and into said base portion toward said aperture.

10. A sunshade mounting clip assembly as set forth in claim 1 wherein said mounting support is generally rectangular in shape.

11. A headliner and sunshade mounting clip assembly for a vehicle comprising:

a headliner for covering a roof of a vehicle;

a mounting clip disposed adjacent said headliner for cooperating with a sunshade, said mounting clip having a shaft extending outwardly therefrom;

a mounting support disposed adjacent said headliner on a side opposite said mounting clip and having an aperture extending therethrough to receive said shaft; and a retainer disposed adjacent said mounting support having an aperture to receive said shaft and preventing said shaft from exiting said mounting support, said mounting support extending laterally and longitudinally to form a footprint greater than a footprint of said retainer.

12. A sunshade mounting clip assembly as set forth in claim 11 wherein said mounting support includes a plurality of projections extending outwardly for engagement with said headliner to resist rotation of said mounting support relative to said headliner.

13. A sunshade mounting clip assembly as set forth in claim 11 wherein said mounting support has a raised base portion, said aperture extending through said base portion.

14. A sunshade mounting clip assembly as set forth in claim 13 wherein said mounting support includes a plurality of ramp portions, one of said ramp portions extending from an edge of said mounting support and into said base portion toward said aperture.

15. A sunshade mounting clip assembly as set forth in claim 14 wherein said retainer has a plurality of spaces, one of said spaces receiving one of said ramp portions to locate said retainer relative to said mounting support.

16. A sunshade mounting clip assembly as set forth in claim 11 wherein said retainer includes a plurality of retainer legs extending outwardly and adapted to extend through an aperture in the roof.

17. A sunshade mounting clip assembly as set forth in claim 11 wherein each of said retainer legs has a flange extending inwardly to prevent said retainer legs from exiting the aperture in the roof.

18. A sunshade mounting clip assembly as set forth in claim 17 wherein said retainer has a catch disposed adjacent said aperture to engage said shaft and retain said retainer thereto.

19. A sunshade mounting clip assembly as set forth in claim 11 wherein said mounting support is generally rectangular in shape.

20. A roof assembly for a vehicle comprising:

a roof of a vehicle;

a roof rail connected to said roof and having an aperture extending therethrough;

a headliner covering said roof;

a mounting clip disposed adjacent said headliner for cooperating with a sunshade, said mounting clip having a shaft extending outwardly therefrom;

a mounting support having a plurality of projections extending outwardly for engagement with said headliner on a side opposite said mounting clip and having an aperture extending therethrough to receive said shaft;

a retainer disposed adjacent said mounting support having an aperture to receive said shaft and preventing said shaft from exiting said mounting support, said mounting support extending laterally and longitudinally to form a footprint greater than a footprint of said retainer; and said retainer having a plurality of retainer legs extending outwardly and extended through said aperture in said roof rail and a flange extending inwardly from each of said retainer legs to prevent said retainer legs from exiting said aperture in said roof rail.

* * * * *